Figure 1:
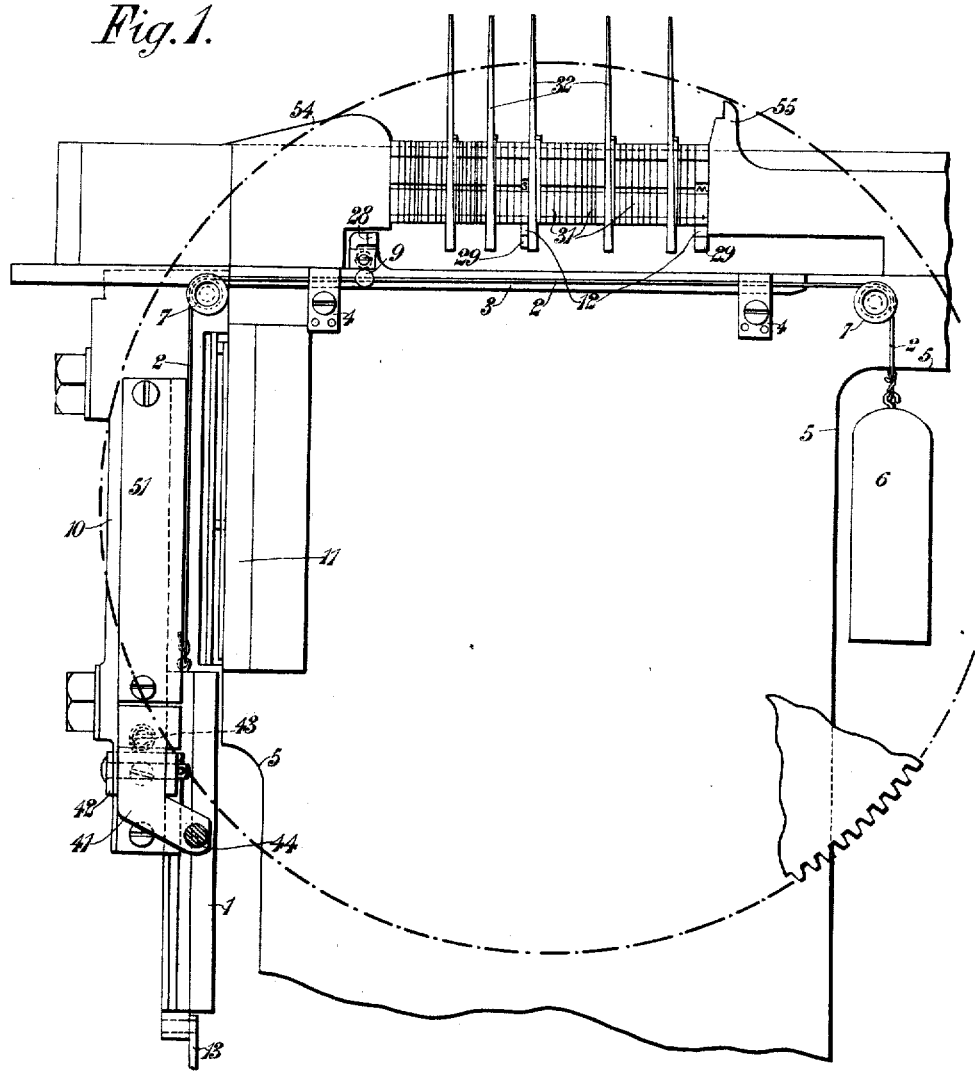

J. E. BILLINGTON & C. HOLLIWELL.
TRIMMING MECHANISM FOR LINOTYPE MACHINES.
APPLICATION FILED NOV. 23, 1907.

910,489. Patented Jan. 26, 1909.

8 SHEETS—SHEET 1.

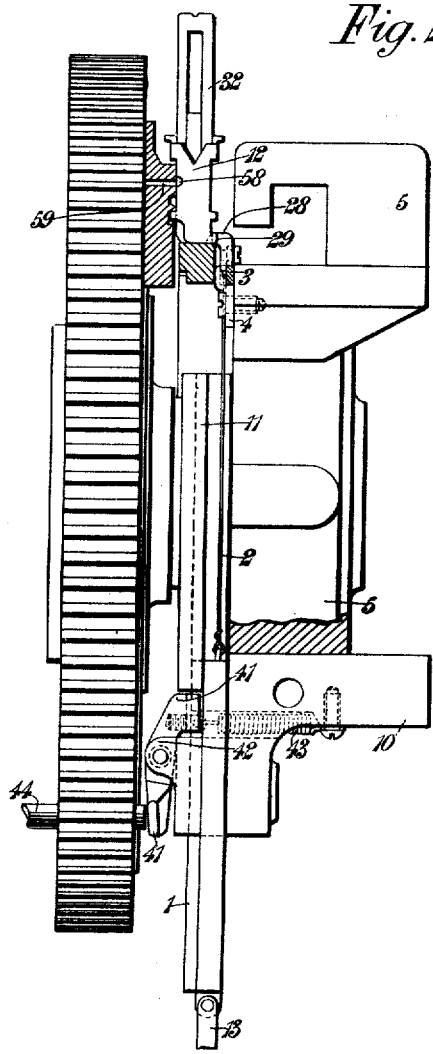

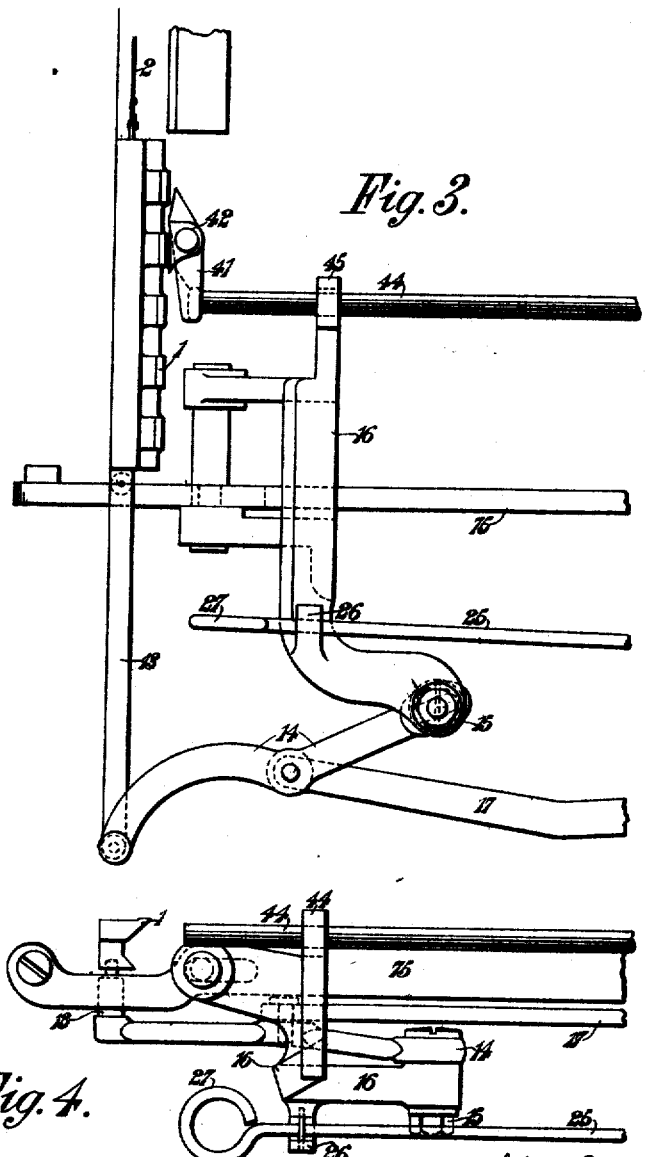

J. E. BILLINGTON & C. HOLLIWELL.
TRIMMING MECHANISM FOR LINOTYPE MACHINES.
APPLICATION FILED NOV. 23, 1907.
910,489.
Patented Jan. 26, 1909.
8 SHEETS—SHEET 4.
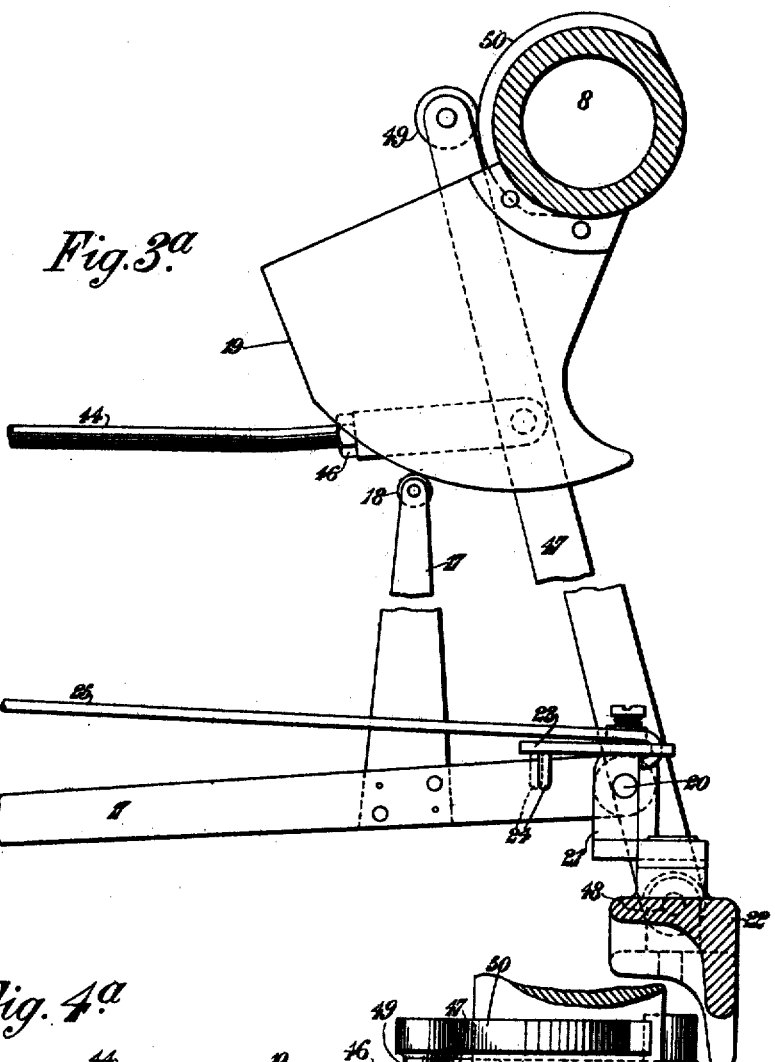
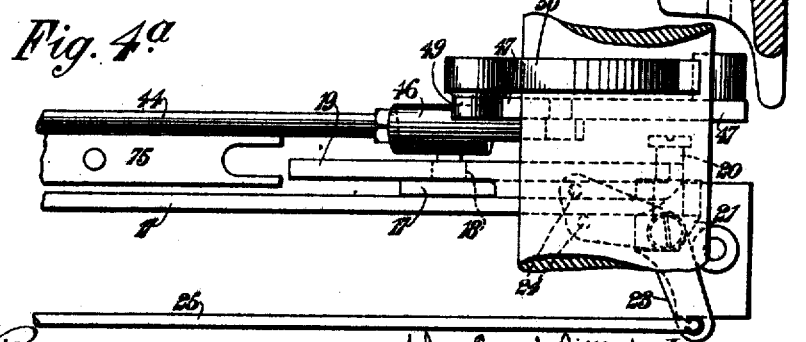

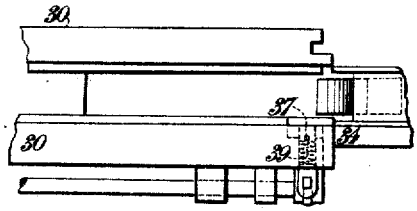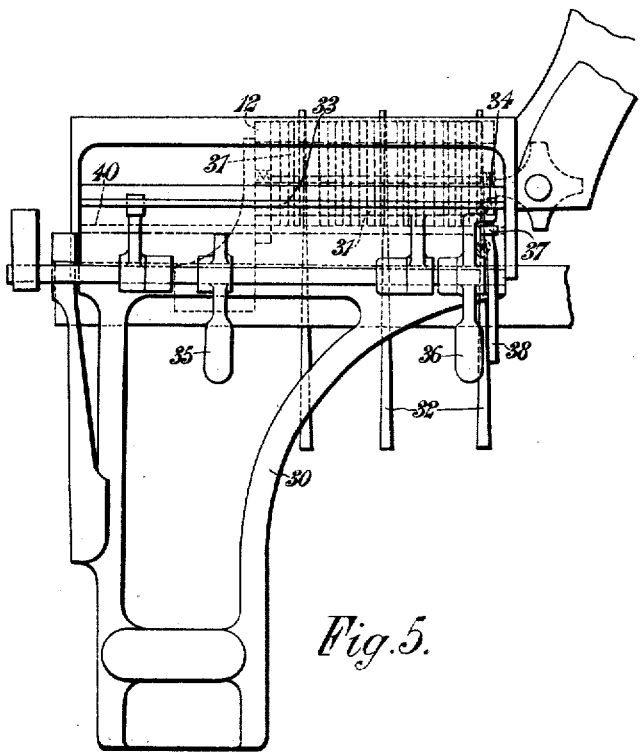

J. E. BILLINGTON & C. HOLLIWELL.
TRIMMING MECHANISM FOR LINOTYPE MACHINES.
APPLICATION FILED NOV. 23, 1907.
910,489.
Patented Jan. 26, 1909.
8 SHEETS—SHEET 6.
Fig. 12.
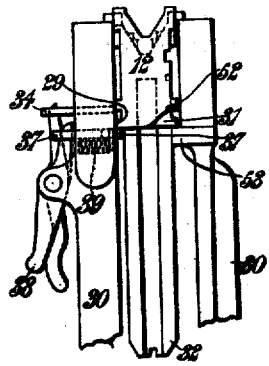
Fig. 8.
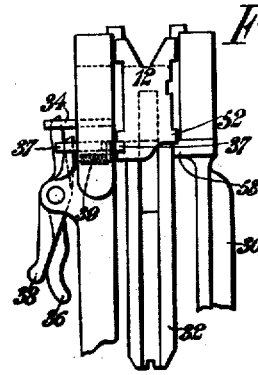
Fig. 7.
Fig. 9.
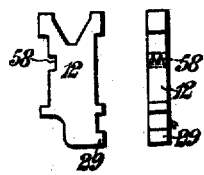
Fig. 10.
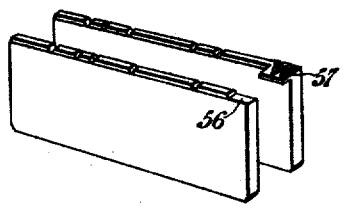
Fig. 11.
Witnesses
W. Sutherland Robinson
J. J. Blaker
John Ernest Billington
Charles Holliwell
Inventors
per Chas. S. Woodroffe
Attorney

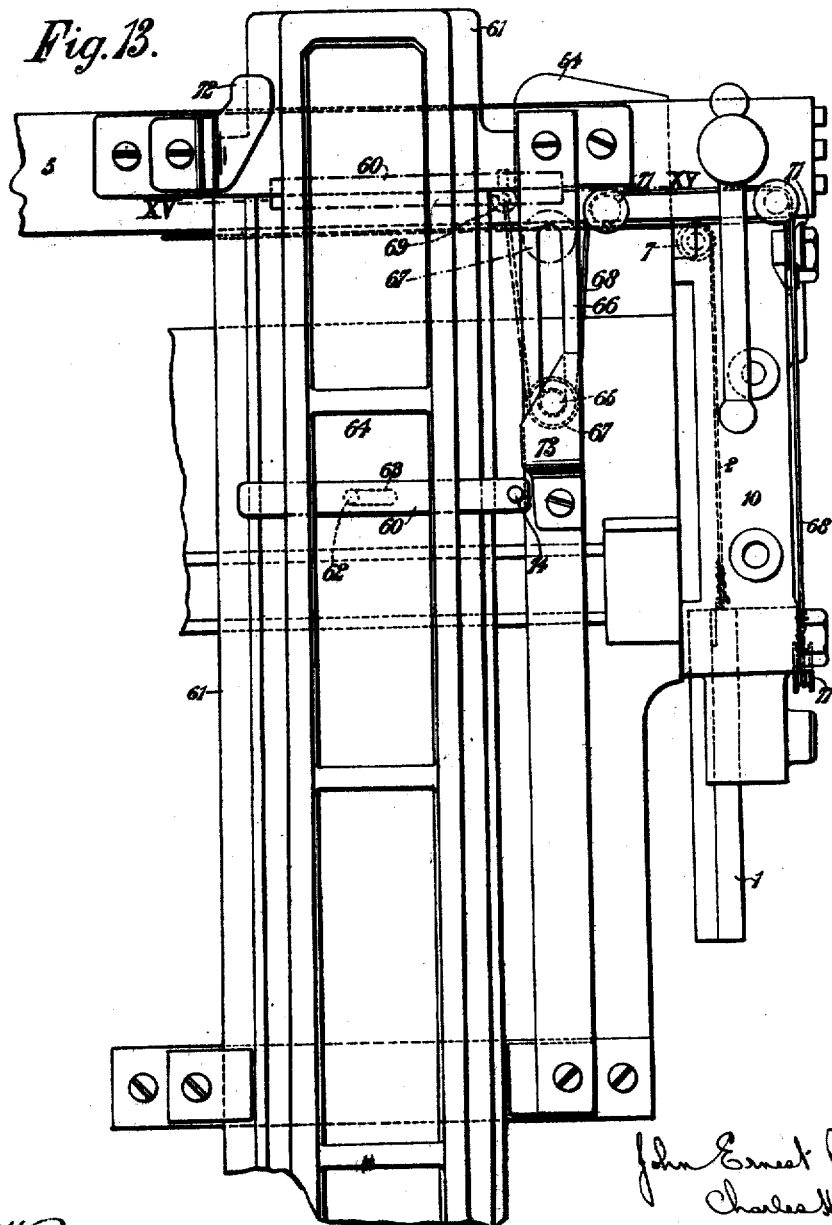

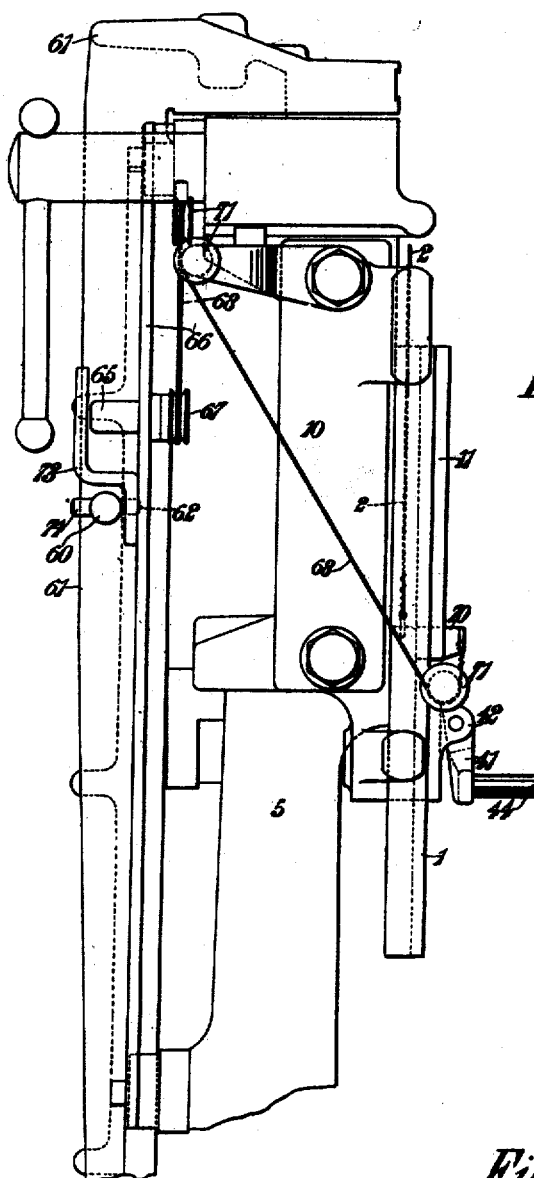

UNITED STATES PATENT OFFICE.

JOHN ERNEST BILLINGTON AND CHARLES HOLLIWELL, OF BROADHEATH, ENGLAND, ASSIGNORS TO LINOTYPE AND MACHINERY LIMITED, OF LONDON, ENGLAND, A REGISTERED COMPANY.

TRIMMING MECHANISM FOR LINOTYPE-MACHINES.

No. 910,489.   Specification of Letters Patent.   Patented Jan. 26, 1909.

Application filed November 23, 1907. Serial No. 403,560.

*To all whom it may concern:*

Be it known that we, JOHN ERNEST BILLINGTON and CHARLES HOLLIWELL, subjects of the King of the United Kingdom of Great Britain and Ireland, and residing at Linotype and Machinery Works, Broadheath, in the county of Chester, England, have invented new and useful Improvements in the Trimming Mechanism of Linotype-Machines, of which the following is a specification.

This invention relates to improvements in the trimming mechanism of linotype-machines, and especially such trimming mechanism as is adapted to trim linotypes having one or more display, or, what are known as, 2-line letters thereon.

Those who are familiar with the machine production of linotypes, are aware that there is a certain amount of trimming to be done to both their sides. This is effected by the ejecter pushing them edge-on between two parallel and vertical knives. A 2-line capital has its lower half projecting beyond the adjacent side of the linotype. Such projection, therefore, renders the trimming of the sides of such a linotype by fixed knives impracticable, for the reason that the said passage would result in the lower half or projection of the capital, or the lower halves or projections of as many as th're may be, being shorn off. Various mechanisms, some manual and some automatic, have been devised for longitudinally moving the knife appertaining to the side of the linotype at which the 2-line letter overhangs, out of the way, so that it may be clear of the overhang or overhangs, as many as there may be, and of returning the said knife to its normal position ready for trimming ordinary linotypes. In some of these devices the presence of the projection has been relied on to stop the return motion of the knife, in order that it should act only on as much of the linotype side as was below the projection extending from it. In these last mentioned devices, difficulty has been experienced owing to the knife, in its return, sometimes bending the 2-line letter by which its stoppage is effected, and indeed in the case of thin 2-line letters such as the capital "I", the overhanging portion is sometimes shorn completely off.

The object of the present invention is to provide means for effecting the stoppage of the return movement of the longitudinally adjustable knife by a special construction of 2-line letter matrix composed into the assembled line of matrices.

In the accompanying drawings which are to be taken as part of this specification and read therewith:—Figure 1 is an elevation of part of the assembler mechanism showing the inside or back of the vise, as viewed from the back of the machine; Fig. 2 is an elevation as seen from the right-hand side of Fig. 1, or left-hand side of the machine; Figs. 3 and 3ª are different parts of the same sectional elevation, as seen from the right-hand side of the machine, showing one arrangement for adjusting the movable knife; Figs. 4 and 4ª are plans of the devices shown respectively in Figs. 3 and 3ª; Fig. 5 is a front elevation of the assembler box and adjacent parts of the machine; Figs. 6 and 7 are respectively a plan and right-hand end elevation of portions of Fig. 5; Fig. 8 is a view similar to Fig. 7 but showing the special 2-line letter matrix in a different position from that in which it is represented in the said Fig. 7; Figs. 9 and 10 are respectively a face view and an edge view of one of the special 2-line letter matrices; Fig. 11 is a perspective view of a pair of complementary linotypes having a single 2-line letter; Fig. 12 is a plan of a pair of complementary linotypes having three 2-line letters; Fig. 13 is a front elevation, and Fig. 14 a right-hand side elevation of an alternative form of construction of apparatus for adjusting the movable knife; and Fig. 15 is a sectional plan taken partly on the line 15—15 of Fig. 13.

According to this invention the longitudinally movable knife 1 is moved in the direction of its length, by any of the well-known means hitherto used for the purpose, for example by the spring-and-cam-actuated lever mechanism show in Figs. 3, 3ª, 4 and 4ª, or, by a pin slidable in the first elevator as hereinafter described with reference to Figs. 13 to 15 inclusive. This movable knife 1, at its upper end, is flexibly connected, as by means of a cord or equivalent 2, to a horizontal slide 3 herein termed a feeler bar guided in guides 4 on the vise frame 5, and through such cord to a weight or equivalent 6, having a constant tendency to move the feeler bar 3 towards the left of the machine that is to say, towards the right-hand side of Fig. 1, and therefore to raise the movable knife 1. The weight 6, although not so shown, is preferably guided, say in a tube fast to the vise frame 5 so that it will not fall from its working position when the vise frame is swung forward. The cord 2 is passed over suitable guide pulleys 7 rotatably mounted on the vise frame 5, and is attached to the feeler bar 3 by a pin or stud 9 carried by the said bar. The knife 1 is arranged to slide in guides in or on the knife block 10 and the fixed knife 11 is fast to the vise frame 5 both, as in existing linotype machines.

Referring now to the knife operating mechanism shown in Figs. 3, 3ª, 4 and 4ª, it will be seen that the movable knife 1 is, at its lower end, connected by a link 13 to one end of a lever 14 whose opposite end is slidably fulcrumed (as by a slot shown in dotted lines in Fig. 3) on a pivot 15 fast to a bracket 16 known, in existing machines, as the "starting handle bracket." At a point about midway of its length, the lever 14 is pivoted to a lever 17 comprising two arms, one approximately horizontal to which the lever 14 is pivoted, and the other, an upstanding one, having pivoted in or on its free end, an antifriction roller 18 which, under the influence of the before described weight 6, has a constant tendency to remain in the path of a rotating cam 19 which is fast to the ordinary cam shaft 8 of the machine. The lever 17 is fulcrumed on a pivot 20 fast in a bracket 21 secured to the machine frame 22, and it is capable of transverse movement on the said pivot to such extent as to enable the roller 18 to be moved into and out of the operative plane of the cam 19. To impart this transverse motion to the lever 17 there is provided a lever 23 pivoted to the bracket 21 and having on one of its arms two downwardly extending pins 24 one on either side of the horizontal arm of lever 17; the second arm of the lever 23 is connected to the rear end of a link or rod 25 whose front end is suitably guided in a lug 26 fast to the starting handle bracket 16, and terminates in a handle or loop 27 situated at a position convenient to the hand of the operator.

In Fig. 4ª the roller 18 is shown to be in the plane of operation of the cam 19, as it would be when linotypes are being cast with 2-line letters thereon, and when it is desired to render the said cam non-effective and therefore retain the movable knife 1 in its uppermost position, as would be desirable when linotypes are required without 2-line letters thereon, the operator pulls the rod 25 towards the front of the machine, that is to say, towards the left of Figs. 3 to 4ª and thereby moves the lever 17 towards the left-hand side of the machine, and the roller 18 out of the operative plane of the cam 19; the reverse of this adjustment is effected when the trimming devices, previously adjusted for trimming linotypes with no 2-line letters, are to be adjusted for trimming linotypes having 2-line letters thereon.

On the before-described feeler bar 3 is secured a feeler 28 which, in its leftward movement (under the influence of the weight 6) is adapted to engage with the right-most of the 2-line letter matrices 12 in the assembled line, each of these matrices, according to the present invention, being provided, for this purpose, with an extra lug or projection 29, see particularly Figs. 9 and 10, extending from its foot in a downward and forward direction.

The matrix shown in Figs. 9 and 10, is one suitable for forming a 2-line "W" such as is represented in Figs. 11 and 12, and, like all the other 2-line letter matrices, it is adapted to be composed into the assembling line by hand, its V-shaped notch being unprovided with distributer teeth, whereby it fails to become engaged with the second distributer and is therefore not delivered into the magazine.

The assembler box 30, Figs. 5, 6, 7 and 8, into which the matrices 31 and space bars 32 are assembled in the usual way, for assembling what are known as double-letter matrices, is, as heretofore, provided with a rib or ledge 33 which is either longitudinally adjustable or, as shown in the accompanying drawings, is fitted with an adjustable auxiliary ledge or portion 34, as described in the specification of Letters Patent No. 615909 so as to admit of the matrices being assembled with either the normal formative cavities or the variant formative cavities in the composing line. The ledges 33 and 34 may, as ordinarily, be moved into and out of their effective positions by levers 35, 36, respectively.

In addition to the adjustable ledges 33 and 34 in the assembler box 30, there is a third adjustable ledge 37 arranged below the auxiliary ledge 34, which, like the other ones, is capable of being moved out of its effective position by a lever 38 but which unlike those other ones, is normally held in its effective position by a spring 39 situated in a recess in the front of the assembler box 30 as shown in dotted lines in Figs. 6, 7 and 8, this spring serving to return the ledge 37 to its normal position as soon as the lever 38, after previous operation, is released. The short ledge 37 as seen in Fig. 5, when in its normal or effective position, forms a continuation of the ordinary ledge 40 on which rest the front bottom lugs of those matrices which are assembled in normal position for casting printing faces of normal font.

For temporarily securing the movable knife 1 in its adjusted position, there is provided a gripper 41, preferably pivoted to a bracket 42 fast to the vise frame 5 or to the knife slide 51 and to one end of which is secured a tension spring 43 whose other end is secured to the knife block 10 as shown in dotted lines in Fig. 2, this spring tending always to pull the upper end of the gripper 41 into its gripping position. With the lower, and, as shown in Fig. 1 laterally deflected, end of the gripper 41, there engages the forward end of a horizontal push rod 44 guided at said forward end in a lug 45 integral with the starting handle bracket 16 and at its rearward end adjustably connected, as by the socket and nut 46, to a lever 47 pivoted at 48 at its lower end to the frame 22 and at its upper end carrying an antifriction roller 49 which is held constantly in the path of, or against, a cam 50 by the action of the before described gripper spring 43, the said cam 50 being fast to the cam shaft 8.

When the machine is at its stopping position, the movable knife 1 is at the top of its stroke, the feeler 28 at the left-most end of its stroke, and the gripper 41 is held away from the knife by the cam 50; this being assumed to be the starting position, the operation may be described as follows. When it is desired to compose a 2-line letter matrix 12 into the assembling line, the operator, by pressing back the lower ends of the two levers 36, 38, withdraws the rear ends of the two shelves 34, 37 from the channel of the assembler box 30 so as to leave room for said matrix to be inserted by the operator into the position in which its bottom rear lug 52 rests on the ordinary shelf 53, as indicated in Fig. 7, this position corresponding with that occupied by each of the other or normal single line letter matrices 31 in the same composed line, as shown best in Figs. 1 and 5. The shelves 34, 37 are then returned to their respective effective positions in which their rear edges project into the channel of the assembler box 30, after which the operator proceeds to complete the composition of the line. The composed line is then passed into the first elevator (not represented in the drawings in connection with this arrangement of the apparatus) and the machine starts in the ordinary way. As the line is carried down to the front of the mold, the movable knife 1 is moved to its lowest position, and the feeler 28 is carried to its rightmost position clear of the composed line as it descends between the vise jaws 54, 55. The movable knife 1 is held down by the concentric part or dwell of the cam 19 until the mold is moved forward into contact with the composed line, at which juncture the said knife and the feeler 28 are allowed to travel back until arrested by the said feeler engaging the nearest or right-most of the lugs 29 of the 2-line letter matrices 12.

If there is only one 2-line letter matrix in the composed line, and that situated at the end of the said line, the feeler will not reach it until the first justification has taken place, the cam 19 allowing the knife 1 and feeler 28 to travel slowly. The act of casting the linotype takes place as ordinarily and, as it is taking place, or thereabouts, the gripper cam 50 through the rod 44, releases the gripper 41 which thereupon, through the influence of the spring 43, engages the knife 1 and retains it in the position determined by the previous engagement of the feeler 28 with the appropriate matrix lug 29. The composed line is next carried upwards by the first elevator during which movement the lug 29 of the special matrix 12 contiguous to the feeler 28, passes up against the left-hand side of such feeler, which latter however remains in position owing to the movable knife 1 being then locked by the gripper 41. The composed line is then swept out of the first elevator, during which operation, the 2-line letter matrices 12 (having no distributing teeth by which they can become attached to the second elevator) fall by gravity out of the assembler box into the front pi bowl. The linotype is then ejected from the mold slot 59, which by that time has been moved from the casting to the ejecting position, and the 2-line letter of such linotype or the lowest of them passes immediately over the top of the movable knife 1, and is thereby unaffected by such knife. After the ejection of the linotype, the gripper 41 is released by the push rod 44 and cam 50, and the weight 6 draws the movable knife 1 to its highest position ready to start a fresh cycle of operations. When there are to be no 2-line letters on the linotype, the operator pulls the rod 22 forward and thereby moves the cam lever 17 laterally out of the operative plane of the cam 19. To form the recess 56 on the next linotype as shown in Figs. 11 and 12, for receiving the over-hang of the 2-line letter or each of such 2-line letters 57 of the immediately preceding linotype, the operator inserts the 2-line letter matrix 12 which was used for producing the said letter, in the same position as that which it occupied in the last preceding composed line, but when doing so he does not withdraw the shelf 37 so that this matrix is supported by its lug 29 resting first on the shelf 37 and afterwards (when moved outwards through the assembler box) on the shelf 40 whereby the formative cavity 58 of that matrix 12 is maintained above the mold slot 59, Fig. 2, with the result that, during the casting operation, a blank 56 is formed, the last named matrix lug 29, when thus supported, passes along what is known as the "italic" groove of the assembler box.

75, Figs. 3 to 4ª, is the usual starting rod cranked near its front end to clear the movable knife 1.

Instead of the movable knife 1 being lowered by the means hereinbefore described this operation may be effected by the mechanism represented in Figs. 13, 14 and 15. In this arrangement a pin 60 is mounted in the uprights of the first elevator 61 in such manner as to admit of it sliding freely in the direction of its length. This longitudinal motion of the pin 60 is limited by a stud 62 fast therein, working in a slot 63 in the web or panel 64 of the first elevator, the said stud 62 also preventing the sliding pin from rotating about its longitudinal axis. The sliding pin 60, when in its right-most position, in which it is shown in dot-and-dash lines near the top of Fig. 13, is adapted during its descent, to engage with a stud 65 which is free to slide in vertical guides 66 on the vise frame 5. On this stud 65 is rotatable a pulley 67 which engages in a bight of a flexible cord or equivalent 68 of which, one end is attached to the vise frame 5 as for example by the hook 69, and the other end is attached to the movable knife 1, as for example by the bracket plate 70, Fig. 14, which is fixed to the upper end of the said knife. At intermediate parts of its length the cord 68 is guided by pulleys 71 rotatably mounted on any convenient supports or parts of the machine, the arrangement being such that when the first elevator 61 is lowered, the desired extent of downward travel shall also be imparted to the movable knife 1.

The vise frame 5 has attached to it two cams 72, 73, of which the upper one 72, is adapted, by acting on the left-hand end of the slidable pin 60, to move the latter into its right-most position in which it is capable of engaging with the stud 65, and the lower one 73, is adapted to move the said pin 60 left-ward out of engagement with the stud 65, by acting on a stud or projection 74 fast to the pin 60 and extending in a forward direction therefrom, this lower cam 73 being situated and shaped so as to effect the just mentioned disengagement when the stud 65 has been depressed into its lowest position. The cam 72, though not so shown in the drawings, is preferably attached to the vise frame 5 so as to be capable of being moved into and out of its effective position in order that, when no 2-line matrices are being used, it shall have no effect upon the pin 60, which in turn, therefore will have no effect upon the stud 65.

The action of the last described form of mechanism may be described as follows:—

When the machine is in its stopping position, the first elevator 61 holds the slidable pin 60 in its topmost position, and the vertically sliding stud 65 and the movable knife 1 are at the top of their respective strokes. During the descent of the first elevator 61, the slidable pin 60 engages with, and depresses the stud 65, and moves the movable knife 1 to its lowest position, in which position, by the before-described gripper 41, it is retained until the assembled line has been justified. As the slidable pin 60 nears its lowest position, the cam 73 moves it out of engagement with the stud 65 so that when the first elevator next ascends, the said pin 60 will clear the stud 65. As the first elevator ascends after the linotype has been cast, the upper cam 72 moves the slidable pin 60 rightwards ready to engage the stud 65 at the next cycle of the machine.

We claim,

1. In a linotype machine, the combination with the two trimming knives, means adapted to move one of them in the direction of its length, and matrices adapted to be assembled in order of composition, of a device capable of being composed into the assembled line of matrices, and adapted to effect the stoppage of the longitudinal movement of the movable trimming knife.

2. In a linotype machine the combination with the two trimming knives, means adapted to move one of them in the direction of its length, and matrices adapted to be assembled in order of composition, of a feeler operatively connected with the longitudinally movable knife and adapted in unison with the said knife to move in a path adjacent to the assembled line of matrices, and a device capable of being composed into the assembled line of matrices and adapted to stop the travel of the feeler and thereby also that of the movable knife.

3. In a linotype machine the combination with a longitudinally movable trimming knife of a matrix; a stop on said matrix, said stop, when an assembled line of matrices including said matrix is held between the vise jaws, being adapted to have an operative relation with said knife.

4. In a linotype machine the combination with a longitudinally movable trimming knife of a feeler operatively connected with said knife and movable with said knife in a path adjacent to an assembled line of matrices; a matrix; a stop on said matrix, said stop, when said matrix constitutes one of the assembled line of matrices, being adapted to have operative relation with said feeler.

5. In a linotype machine the combination with a longitudinally movable trimming knife of a feeler operatively connected with said knife and movable with said knife in a path adjacent to an assembled line of matrices; a matrix; a lug or projection on said matrix, said lug or projection, when said matrix constitutes one of the assembled line of matrices aforesaid, being adapted to project into the path of said feeler.

6. In a linotype machine the combination with two trimming knives, one of which is longitudinally movable, of a two-line letter matrix; a lug or projection on said matrix, said lug, when said matrix constitutes one of an assembled line of matrices brought adjacent to said knife, being adapted to have arresting relation with said movable knife.

7. In a linotype machine the combination with a longitudinally movable trimming knife of a matrix; a lug laterally projecting from said matrix said lug being spaced from, parallel with, and in the plane of, one of the bottom lugs of said matrix, and said lug, when said matrix constitutes one of an assembled line of matrices, being adapted to have arresting relation with said movable knife 8. In a linotype machine the combination of the two trimming knives, means adapted to automatically move one of them in the direction of its length, matrices adapted to be assembled in order of composition, a feeler adapted to move in a path adjacent to the assembled line of matrices, a flexible connector connecting the feeler with the movable knife, and a lug or projection on one of the matrices adapted to project into the path of the feeler.

9. In a linotype machine the combination of the two trimming knives, cam and weight mechanism adapted to move one of the knives longitudinally in respectively opposite directions, gripper mechanism adapted to retain the movable knife in position against the influence of the weight, cam mechanism adapted to disengage the gripper from the movable knife, matrices adapted to be assembled in order of composition, a feeler adapted to move in a path adjacent to the assembled line of matrices, a flexible connector connecting the feeler with the movable knife and weight, and a lug or projection on one of the matrices adapted to project into the path of the feeler.

10. In a linotype machine the combination of the two trimming knives, a lever operatively connected with one of the knives adapted to move it in the direction of its length, a cam adapted to operate the lever and means adapted to move the lever into and out of operative connection with the cam.

11. In a linotype machine the combination of the two trimming knives, a lever operatively connected with one of the knives adapted to move it in the direction of its length, a cam adapted to operate the lever, means adapted to move the lever into and out of operative connection with the cam, gripper mechanism adapted to temporarily retain the movable knife in position, cam mechanism adapted to disengage the gripper from the movable knife, matrices adapted to be assembled in order of composition, a feeler adapted to move in a path adjacent to the assembled line of matrices, a flexible connector connecting the feeler with the movable knife, and a lug or projection on one of the matrices adapted to project into the path of the feeler.

12. In a linotype machine the combination of the two trimming knives, one of which is longitudinally movable, matrices adapted to be assembled in line in order of composition, vertically movable first elevator adapted to receive the said line of matrices, a feeler operatively connected with the longitudinally movable knife and adapted, in unison with the said knife, to move in a path adjacent to the assembled line of matrices, a device capable of being composed into the assembled line of matrices and adapted to stop the travel of the feeler and thereby that of the movable knife, a sliding pin capable of sliding horizontally in the direction of its length in the first elevator, devices adapted to move the sliding pin in respectively opposite directions, a flexible connector attached at one end to the movable knife and at the other end to a relatively fixed point and adapted to be operatively engaged with the flexible connector for moving the movable knife in one direction.

13. In a linotype machine the combination of assembler box, matrices adapted to be assembled therein and one of which may have a laterally projecting lug beneath one of its bottom lugs; a longitudinally movable knife; a rigid ledge in said assembler box and adapted to support bottom lugs of said matrices; a horizontally movable continuation for said ledge; and means for moving said continuation into and out of line with said ledge to permit, at will, the passage of said laterally projecting lug past said ledge, in order that said lug may have arresting relation with said knife.

In witness whereof we have hereunto set our hands in the presence of two witnesses.

JOHN ERNEST BILLINGTON.
CHARLES HOLLIWELL.

Witnesses:
 THOMAS A. ANDREWS,
 WILLIAM H. SHARPE.